Patented Jan. 22, 1952

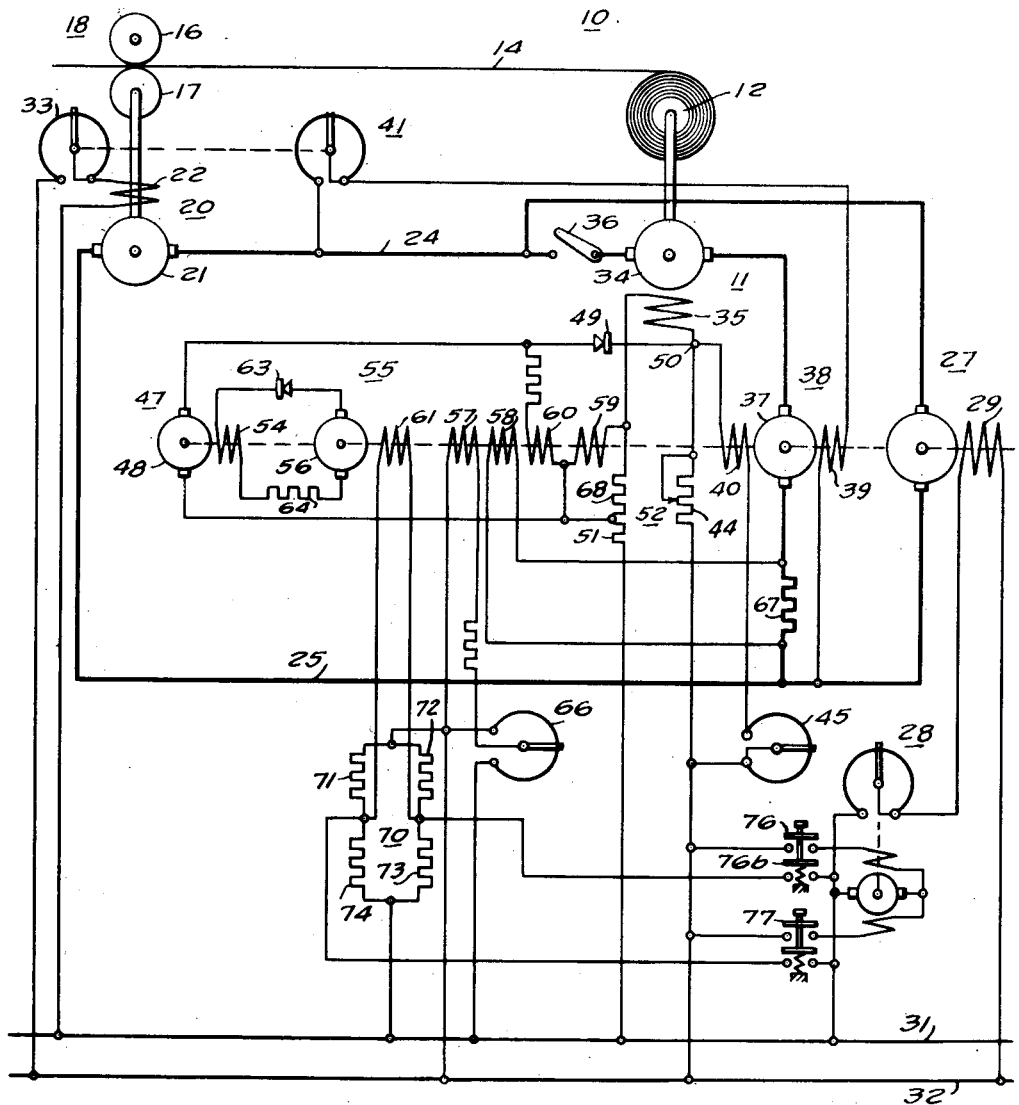

2,583,148

UNITED STATES PATENT OFFICE 2,583,148

REEL MOTOR CONTROL SYSTEM

Albert W. Kimball, Snyder, N. Y., and Eugene F. Allbert, Turtle Creek, Pa., assignors to Westinghouse Electric Corporation, East Pittsburgh, Pa., a corporation of Pennsylvania Application October 24, 1946, Serial No. 705,463

10 Claims. (Cl. 242—75)

1

Our invention relates generally to motor control systems, and it has reference in particular to control systems for reel motors used in the strip mills or the like.

Generally stated, it is an object of our invention to provide a control system for reel motors which is simple and inexpensive to manufacture, and which is reliable and efficient in operation.

More specifically, it is an object of our invention to provide a control system for reel motors using a single regulating generator for so controlling the reel motor as to maintain a predetermined tension in a strip of material and to compensate for coil build-up.

It is also an object of our invention to provide for so controlling a reel motor as to transfer smoothly from a stalled condition to a running condition by eliminating the use of relays in the control system.

Another object of our invention is to provide a control system for reel motors wherein the reel motor requires only a single field winding.

Yet another object of our invention is to provide a control system for reel motors wherein variations in strength of the motor field from the minimum to the maximum condition are made more smoothly than heretofore.

It is also an important object of our invention to provide for regulating the armature current of a reel motor under stalled conditions, so as to prevent the tension of the strip from exceeding a predetermined value or the reel from unwinding.

Still another object of our invention is to provide a simple and effective control system for reel motors wherein the strip tension is effectively and accurately controlled under running as well as stalled conditions.

A further object of our invention is to provide a control system for reel motors wherein the speed of the reel motor is so controlled that it more accurately matches the speed of a strip leaving the preceding roll stand.

Another important object of our invention is to provide, in a control system for reel motors embodying a regulating generator having a self-energizing field winding, for energizing the self-energizing field winding in accordance with the bias current in the regulated circuit as well as the regulating current, whereby the transfer from a non-regulating to a regulating condition is made more smoothly.

Other objects will in part be obvious, and will in part be explained hereinafter.

In practicing our invention in one of its forms,

2 a booster generator is used to regulate the voltage applied to the armature of a reel motor from the main mill bus. The main field winding of the booster generator is connected to the same bus, and its field rheostat is operatively connected to the field rheostat of the motor driving the last roll stand. A regulating field winding is provided on the booster generator and is connected in circuit relation with the field winding of the reel motor to a control bus, which normally provides a minimum safe-value of field current for the reel motor field winding. Regulation of the reel motor to maintain tension and compensate for coil build-up is effected by connecting an exciter across the field winding thereof, whose output is controlled by a regulating generator, which is responsive to the armature current of the reel motor and which has a self-energizing field winding connected across a resistor in series circuit relation with the reel motor field winding. Under stalled conditions the regulating generator controls the strip tension by varying the voltage across the reel motor field winding, whereby the voltage across the regulating field winding is also varied to regulate the reel motor armature current.

For a more complete understanding of the nature and scope of our invention, reference may be made to the following detailed descriptions, which may be read in connection with the accompanying drawing, in which the single figure is a diagrammatic view of a control system for reel motors embodying the invention in a preferred form.

Referring to the drawing, the reference numeral 10 may denote generally a control system for a reel motor 11 which may drive a reel 12 for winding a strip of material 14 as it is delivered from the rolls 16 and 17 of a roll stand 18, which may be the last stand of a tandem mill.

A motor 20 having an armature 21 and a field winding 22 may be employed to drive the roll stand 18. The armature 21 may be connected to a main mill bus comprising conductors 24 and 25, which may be energized from a main generator 27 driven by a suitable prime mover (not shown). The voltage of the main generator 27 may be varied by means of a motor-operated rheostat 28, which may be connected in circuit relation with the field winding 29 of the main generator, and a control bus comprising conductors 31 and 32. The field winding 22 of the mill motor 20 may be energized from the conductors 31 and 32 through a rheostat 33.

The reel motor 11 may comprise an armature 34 and a field winding 35. The armature 34 may be connected between the bus conductors 24 and 25 through a suitable switch 36, in series circuit relation with the armature 37 of a booster generator 38, having main and auxiliary field windings 39 and 40, respectively. The armature 37 may be driven by the prime mover of the main generator 27.

The main field winding 39 of the booster generator may be connected between the bus conductors 24 and 25, so that the energization thereof will be varied in response to changes in the voltage applied to the mill motor 20 of the roll stand 18. In order to match the speed of the reel motor 11 with the speed of the roll stand 18, a rheostat 41 may be provided for further varying the energization of the main field winding 39. The rheostat 41 may be operatively connected to the field rheostat 33 of the mill motor 20, so that the energization of the field winding 39 may be varied in accordance with the speed of the mill motor.

The auxiliary field winding 40 of the booster generator may be used to obtain some regulation of the output of this generator 38 under running conditions, as well as for obtaining a predetermined output thereof under stalled conditions when the voltage of the bus conductors 24 and 25 at the main generator will be reduced to almost zero. For this purpose, the auxiliary field winding 40 may be connected across a variable control resistor 44 in circuit relation with the field winding 35 of the reel motor between the control conductors 31 and 32. A rheostat 45 may be provided for varying the voltage drop across the control resistor 44 which will be necessary to provide the booster generator voltage required to supply the value of armature current for which the pattern field rheostat 66 is adjusted. The energization of the field winding 35 of the reel motor will accordingly be determined so as to obtain different predetermined values of stalled tension in the strip 14, as will be explained hereinafter.

In order to provide for regulating the energization of the field winding 35 of the reel motor, as well as that of the auxiliary field winding 40 of the booster generator, means such as an exciter 47 may be employed for applying a suitable regulating voltage thereto. The armature 48 of the exciter 47 may, for example, be connected in circuit relation with a unidirectional current device 49 to one terminal 50 of the field winding 35, and to a tap 51 on a resistor 52 connected in circuit relation with the other terminal of the field winding. The device 49 prevents the armature 48 from becoming a low impedance shunt across the field winding 35 when its output is at a low value. The field winding 54 of the exciter 47 may be energized from means such as the regulating generator 55.

The regulating generator 55 may be provided with an armature 56 and a plurality of field windings 57, 58, 59, 60 and 61. The armature 56 may be connected to the exciter field winding 54 through a unidirectional current device 63 which prevents reversal of the output voltage of the exciter when the output of the regulating generator may be reversed under no load conditions, and a suitable control resistor 64.

The field winding 57, which may be termed "the pattern field winding," may be connected to the control conductors 31 and 32 through a rheostat 66, which may be adjusted to vary the energization of the pattern field winding, and hence, the tension which shall be maintained in the strip 14 by the reel motor 12.

The field winding 58, which may be termed "the control field winding," is differential with respect to the pattern field winding 57. The control field winding 58 may be connected across a resistor 67 in circuit relation with the reel motor armature 29 to be energized in accordance with the value of the reel motor armature current, so that the regulating generator 55 regulates the armature current of the reel motor 11.

The field winding 59, which may be termed "the self-energizing field winding," may be connected across the portion 68 of the resistor 52, so as to be energized both in accordance with the value of the bias current passing through the reel motor field winding 35 from the control conductors 31 and 32, and in accordance with the current passing therethrough from the exciter 47 under the control of the regulating generator 55.

The field winding 60 is an anti-hunt field winding and may be utilized for limiting over-shoot of the regulating generator, so as to stabilize the operation thereof. The use of a field winding of this type on a regulating generator is the subject matter of a co-pending application, Serial No. 705,462, of Eugene F. Allbert and William R. Harding, filed on October 24, 1946, now abandoned.

The field winding 61 is an inertia compensation field winding, the use of which is the subject matter of a co-pending application of William R. Harding and Basil J. Auburn, Serial No. 708,379, filed November 7, 1946, now Patent No. 2,516,001 of July 18, 1950. It may be connected, as shown, to a bridge circuit 70 of resistors 71, 72, 73 and 74, which are under the control of contacts on the "raise" and "lower" push button switches 76 and 77, respectively. The resistors 73 and 74 will be shunted in response to the closure of the switches so as to provide for selectively making the field winding 61 cumulative or differential with respect to the pattern field winding 57, whenever the rheostat 28 is operated to increase the voltage of the main generator 27 to speed up the roll motor 20, or to decrease it and slow the motor down.

When the reel 12 is empty, the speed of the reel motor 11 is determined by the bias voltage applied to its field winding 35 from the control conductors 31 and 32. The speed of the periphery of the reel drum should be slightly greater than the speed of the strip as it leaves the rolls 16 and 17. The speed of the reel motor may be matched to the speed of the strip by varying the adjustment of the resistor 44, which will change the energization of the auxiliary field winding 40 of the booster generator 38 and will also vary the reel motor field current.

In order to best understand the problem of tension regulation it should be realized that, neglecting friction and other losses, the torque T which the reel motor must develop to maintain a predetermined tension $t$ in the strip, must equal $$t \times \frac{d}{2}$$

where $d$ is the diameter of the coil of the strip wound on the reel. Since the torque $T = k\phi I$, where $k$ is a constant, $\phi$ is the field flux, and $I$ is the armature current, the tension of the strip may be maintained by regulating the armature current $I$.

Now the armature current $I$ is dependent on the differential between the line voltage E and the counter electromotive force C. E. M. F., since $E - IR = C. E. M. F.$ The counter electromotive force in turn is equal to $\phi \times R.P.M. \times k'$, where R. P. M. is the revolutions per minute and $k'$ is a proportionality constant.

Accordingly, for a given speed of the reel motor, the armature current may be regulated by varying the reel motor field current to vary $\phi$ and hence the C. E. M. F. This in turn determines I.

As the diameter of the coil of strip on the reel increases, the speed of the reel motor necessarily decreases. This reduces the C. E. M. F., and $\phi$ must accordingly be increased to restore the desired value of I. The new product of $k\phi I$ will be greater, in proportion to the coil diameter, thus enabling the tension $t$ to remain constant with the increased value of coil diameter $d$.

Under stalled conditions the reel motor speed is zero, so that the C. E. M. F. is zero and the armature current I is determined by the equation $$IR = E + V_B$$

where $V_B$ is the output voltage of the booster generator. Accordingly, by regulating the field current of the booster generator 38 when the reel is stalled, the armature current I and the reel motor torque T may be regulated.

When the strip is wrapped on the reel, it is quickly drawn tight and tension is secured. As the empty reel speed is usually slightly in excess of the strip speed, the tension rises rapidly to a value which is often in excess of the desired tension. Accordingly, the armature current of the reel motor increases rapidly until the desired proper tension is momentarily exceeded.

As the tension increases, the reel motor armature current increases and the voltage across the resistor 67 in the armature circuit of the reel motor increases, so that the energization of the differential or control field winding 58 of the regulating generator is increased. When more than the proper value of tension is obtained, the magnetomotive force produced by the control field winding 58 more than balances that produced by the pattern field winding 57. The output of the regulating generator 55 will thereupon be such as to increase the energization of the reel motor field winding 35, so that the counter electromotive force is increased, and the armature current decreased. The increased voltage drop across the field winding 35 reduces the voltage applied to the booster generator field winding 40, further assisting in decreasing the reel motor armature current.

As the armature current decreases the energization of the control field winding 58 is accordingly decreased until a balance between the magnetomotive forces of the control and pattern field windings 58 and 57 is obtained. The output of the regulating generator 55 is held at the balancing value by the self-energizing field winding 59.

Should the tension decrease below the desired value, the magnetomotive force of the pattern field winding 57 predominates, and the voltage applied by the exciter 47 across the field winding 35 of the reel motor 12 will be decreased, resulting in decreased reel motor field flux. The counter electromotive force of the reel motor will be thereby gradually reduced until the armature current increases sufficiently to restore a balance between the magnetomotive forces of the pattern and control field windings. The output of the regulating generator 55 will be held at such a value as to maintain the flow of armature current necessary to produce the desired tension in the strip 14. The reduction in energization of the field winding 35 also increases the energization of the booster generator field winding 40 and thus further effects an increase in the reel motor armature current.

During acceleration of the reel motor 12, which may be caused by speeding up the mill motor 20, the voltage applied to the armature 34 of the reel motor will obviously be increased, since it is connected to the bus conductors 24 and 25. An increase in the speed of the mill motor 20 over its base speed resulting from operation of the field rheostat 33 will be matched by variation in the excitation of the main field winding 39 of the booster generator, through operation of its field rheostat 41, which is operatively connected to the rheostat 33.

While the mill motor 20 is oeing accelerated, the "raise" push button switch 76 will be in the operative or closed position. Accordingly, the resistor 73 of the bridge circuit 70 will be shunted by contact member 76b. The compensating field winding 61 is so connected in the bridge circuit 70 that the unbalanced current flowing therethrough makes the field winding 61 cumulative, with respect to the pattern field winding 57. The output of the regulating generator 55 will, accordingly, be reduced, so that the energization of the field winding 35 of the reel motor is likewise reduced. The counter electromotive force of the reel motor is therefore reduced so that the armature current increases. The torque of the reel motor is increased thereby to compensate for the inertia of the coil of the strip wound on the reel and other rotating reel parts.

During deceleration, the energization of the field winding 61 will be reversed. The magnetomotive forces of the inertia compensating and control field windings will predominate and the output of the regulating generator 55 will effect an increase in the energization of the reel motor field winding 35. The counter electromotive force is thereby increased, so that the armature current is reduced and the torque of the reel motor is reduced, so as to compensate for the overrunning effects of the inertia of the strip wound on the reel, etc. Accordingly, the tension in the strip 14 is maintained more nearly at the predetermined value.

Stalled tension for inspection of the strip or mill, for locking the strip in the jaws of a clamp type reel, or for the removal of a bad tail-end portion of the strip, etc. can be obtained by lowering the voltage of the main generator 27 to such a low value that the mill will not run. Under these conditions, the effect of the main winding 39 of the booster generator 38 will be almost negligible. The energization of the auxiliary field winding 40, which is connected in circuit relation with a field winding 35 of the reel motor is controlling.

The value of stalled tension to be maintained will be determined by the operating position of the rheostat 45. This rheostat determined the output voltage of the regulating generator 55 which will be necessary to obtain the booster generator output voltage required to maintain the value of armature current through the reel motor for which the pattern field rheostat 66 is set. The output voltage of the regulating generator determines the field current through the reel motor field winding so that the setting of the rheostat determines the reel motor torque, and hence, the strip tension under stalled conditions. During stalled tension, the energization of the field winding 35 will not remain in direct proportion to the coil diameter, since the armature 35 of the reel motor is not rotating.

If the tension in the strip 14 exceeds the predetermined value, the current in the armature circuit of the reel motor increases the output of the regulating generator 55, and hence, the output of the exciter 47 likewise increases. Increased energization of the reel motor field winding 35 from exciter 47 decreases the voltage across the control resistor 44, and hence, decreases the energization of the auxiliary field winding 40. This reduces the output voltage of the booster generator 38, and hence, reduces the current circulated through the armature of the reel motor 12 by the booster generator 38. The decrease in armature current will be much greater proportionately than the increase in reel motor field current. Accordingly, the torque of the reel motor is reduced to the predetermined value, which may be controlled by varying the adjustment of the rheostat 45.

If the voltage of the main generator 27 is then raised, such as after examining the strip or mill, for starting the mill, the main field winding 39 of the booster generator 38 again dominates, and regulation of the strip tension is obtained primarily through variation in the energization of the reel motor field winding 35 through the operation of the regulating generator 55.

As the diameter of the coil on the reel 11 increases during operation, the reel motor slows down and the armature current of the reel motor 12 is increased due to the decreased C. E. M. F. This causes increased energization of the control field winding 58 of the regulating generator, which increases the output of the regulating generator and the exciter 47, so as to strengthen the energization of the reel motor field winding 35. The reel motor C. E. M. F. is thereby restored so that the armature current returns to normal, and the motor therefore develops a greater torque and restores the predetermined value of tension. This effect takes place progressively as the diameter of the reel increases.

From the above description and the accompanying drawing, it will be apparent that we have provided, in a simple and effective manner, for controlling the operation of a reel motor to obtain a predetermined tension under running conditions, and a limiting value of strip tension under stalled conditions. The tension of the strip is regulated and compensation is provided for coil build-up by using only a single regulating generator. By utilizing a control system embodying the features of our invention, only a single field winding is necessary on the reel motor, so that a standard line of motors may be used instead of having to provide motors with special field windings. Since the self-energizing field winding of the regulating generator receives its intelligence from both the bias current as well as the regulating current supplied to the reel motor field winding, operation of the regulating generator under varying field current conditions is greatly improved, so that the transfer from minimum field current to maximum field current may be made more smoothly than heretofore. Wrapping of the strip on the reel is greatly facilitated by providing for more accurately matching the speed of the reel motor with that of the last roll stand over a wide range of operating speeds.

Since certain changes may be made in the above-described construction and different embodiments of the invention may be made without departing from the spirit or scope thereof, it is intended that all the matter contained in the above description and shown in the accompanying drawing shall be considered as illustrative and not in a limiting sense.

We claim as our invention:

1. In a control system for a reel drive, a reel motor having an armature connected to drive the reel and having a field winding, circuit means connecting the armature to a source of electrical energy, additional circuit means connecting the field winding to a source of electrical energy to provide a minimum safe value of field current, and regulating means responsive to the load on the reel motor connected to vary the energization of the field winding to maintain a predetermined tension in material wound on the reel.

2. For use with a reel motor having an armature and a field winding and arranged to wind a strip worked on by a motor-driven roll stand having control means operable to vary the speed thereof, a booster generator having an armature connected in circuit relation with the reel motor armature and a source of electrical energy supplying the motor of the roll stand, said booster generator being provided with a plurality of field windings, circuit means including means operable in accordance with the control means of the motor of said roll stand connecting one of the booster generator field windings to said source, additional circuit means connecting another of said booster generator field windings in circuit relation with the reel motor field winding to a source of control voltage, and means responsive to the armature current of the reel motor connected to effect energization of the reel motor field winding in accordance with the reel motor armature current.

3. For use with a reel motor having an armature energized from a source of electrical energy and having a field winding, circuit means connecting the field winding to a source of electrical energy, and circuit means connected across the field winding to vary the energization of said field winding including a regulating generator responsive to the load on the reel motor and a unidirectional current device.

4. In a control system for a motor having an armature and a field winding, circuit means connecting the armature to a source of electrical energy, additional circuit means connecting the field winding to a source of electrical energy to provide a predetermined value of field current, regulating means connected across the field winding including a regulating generator having a field winding of the self-energizing type and a plurality of additional field windings energized to vary the output and obtain a balanced condition, and circuit means connecting the self-energizing field winding for energization in accordance with the predetermined value of field current and the output of the regulating generator.

5. In combination, a motor having an armature energized from a source of electical energy and a field winding, circuit means connecting the field winding to a source of electrical energy including an impedance device, control means including a regulating generator having opposed pattern and control field windings energized from a control source and in accordance with the armature current, respectively, and having a field winding of the self-energizing type, and circuit means connecting the self-energizing field winding across at least a portion of the impedance device.

6. In a control system for a reel motor having an armature connected across a bus supplying electrical energy to the drive motor of the last roll stand of a mill and having a field winding, said drive motor having speed controlling means, a booster generator having an armature connected in circuit relation with the reel motor armature and having main and regulating field windings, circuit means including means operable in accordance with the operation of the speed controlling means of said last roll stand connecting the main field winding to the bus supplying the drive motor of said last stand, additional circuit means connecting the regulating field winding in circuit relation with the reel motor field winding to a source of electrical energy, and means varying the voltage across the reel motor field winding and the regulating field winding including regulating means responsive to the motor load.

7. In a reel control system, in combination, a reel motor for driving a reel for winding material being worked by a roll stand having control means operable to vary the speed thereof, said reel motor having an armature and a field winding, a booster generator connected in circuit relation with the reel motor armature having field control means operable in response to operation of the control means of the roll stand, regulating means responsive to the armature current connected for controlling the energization of the reel motor field winding to maintain a predetermined tension in a strip on the reel under normal operating conditions and for controlling the output of the booster generator under stalled conditions to limit the value of the stalled armature current.

8. In a control system for a reel handling strip material under tension that is being worked by a roll stand having control means operable to vary the speed thereof, a reel motor having an armature connected to drive the reel and a field winding, means connecting the field winding to a source of electrical energy for providing a minimum safe value of field current, regulating means controlling the reel motor including a regulating generator responsive to the armature current of the reel motor connected to vary the energization of the field winding, and means connecting the reel motor armature to a source of electrical energy including a booster generator having an armature connected in circuit relation with the reel motor armature and a main field winding energized in accordance with operation of the control means of the roll stand for normally matching the speed of the reel motor with the speed of said roll stand, said booster generator having a regulating field winding connected in circuit relation with the reel motor field winding for regulating the output of the booster generator when the voltage of the source supplying the reel motor armature is reduced to obtain stalled conditions, whereby the stalled tension of the strip is limited to a predetermined value.

9. In a control system, a reel motor for driving a reel for winding strip material being worked by a roll stand driven by a motor having a field rheostat, said motor having an armature and a field winding, means including a booster generator connecting the armature to a source of electrical energy, said booster generator having a main field winding connected to a source of electrical energy in circuit relation with a rheostat operatively connected to the roll stand motor field rheostat and an auxiliary field winding, circuit means connecting the auxiliary field winding to a source of electrical energy in circuit relation with the reel motor field winding, and means producing a regulating voltage responsive to a departure from a predetermined strip tension connected across the reel motor field winding for controlling the energization of the reel motor field winding.

10. In a control system for a reel winding a strip material under tension from a motor-driven roll stand, said roll motor having a speed controlling field rheostat a reel motor having an armature and a field winding, circuit means including impedance means connecting the field winding to a source of electrical energy, a control generator having a field winding and an armature connected in circuit relation with the reel motor field winding and a portion of said impedance means through a unidirectional current device, a regulating generator connected to energize the control generator field winding having a pattern field winding energized from a source of control voltage and a differential control field winding energized in accordance with the armature current of the reel motor, and a booster generator having an armature connected in circuit relation with the reel motor armature and a bus supplying electrical energy to the motor of the roll stand, said booster generator having a main field winding energized from said bus through a rheostat operable in accordance with the field rheostat of said roll stand motor and an auxiliary field winding connected across another portion of said impedance means for controlling the voltage of the booster generator when the voltage of the main bus is reduced under stalled conditions, whereby the stalled tension of the strip is regulated.

ALBERT W. KIMBALL.
EUGENE F. ALLBERT.

REFERENCES CITED

The following references are of record in the file of this patent:

UNITED STATES PATENTS

| Number | Name | Date |
| --- | --- | --- |
| 2,165,127 | Carnegie | July 4, 1939 |
| 2,305,937 | Montgomery et al. | Dec. 22, 1942 |
| 2,306,157 | Edwards et al. | Dec. 22, 1942 |
| 2,462,171 | Erbe et al. | Feb. 22, 1949 |